United States Patent

Matsuno

Patent Number: 5,297,047
Date of Patent: Mar. 22, 1994

[54] DIAGNOSTIC ARRANGEMENT FOR USE WITH AUTOMOTIVE ENGINE SYSTEMS

[75] Inventor: Osamu Matsuno, Yokohama, Japan

[73] Assignee: Nissan Motor Co., Ltd., Yokohama, Japan

[21] Appl. No.: 725,063

[22] Filed: Jul. 5, 1991

[30] Foreign Application Priority Data

Jul. 6, 1990 [JP] Japan ................................. 2-178861

[51] Int. Cl.$^5$ ...................... G06F 15/00; G01M 15/00
[52] U.S. Cl. ........................... 364/431.06; 364/551.01; 73/117.3
[58] Field of Search ........................ 364/424.03, 424.04, 364/551.01, 575, 558, 483, 484, 485, 554, 431.06; 73/117.2, 117.3, 119 R

[56] References Cited

U.S. PATENT DOCUMENTS

| | | | |
|---|---|---|---|
| 3,872,846 | 3/1975 | Taplin et al. | 123/119 A |
| 4,050,297 | 9/1977 | Pettingell et al. | 73/117.2 |
| 4,441,359 | 4/1984 | Ezoe | 73/117 |
| 5,137,004 | 8/1992 | Takahata et al. | 123/571 |

FOREIGN PATENT DOCUMENTS

3121645 12/1982 Fed. Rep. of Germany .
62-51746 3/1987 Japan .

Primary Examiner—Thomas G. Black
Assistant Examiner—Michael Zanelli
Attorney, Agent, or Firm—Foley & Lardner

[57] ABSTRACT

In order to quickly and accurately determine if a given system is malfunctioning or not, a selected parameter is sampled and an average value developed. As the number of sequential samples increases and the average becomes more reliable, the standard against which it is judged is also varied so as to render the test for normal operation more severe.

4 Claims, 5 Drawing Sheets

FIG.6(a) EGR CUT-OFF VALVE

FIG.6(b) INDUCTION PRESSURE

FIG.7

DIAGNOSTIC ARRANGEMENT FOR USE WITH AUTOMOTIVE ENGINE SYSTEMS

BACKGROUND OF THE INVENTION

1. Field of the Invention

The present invention relates generally to a diagnostic arrangement which enables a sensor malfunction or the like to be detected, and more specifically to such a type of system which enables the standard against which the instant performance is judged, to be varied in accordance with the number of times a given parameter is sampled.

2. Description of the Prior Art

In order to meet recent stringent emission control regulations it is becoming necessary to equip vehicles with diagnostic arrangements which enable the malfunction of sensors or systems associated with the control/operation of an exhaust gas recirculating system generally abbreviated as an EGR, air-fuel ratio control systems and the like, to be detected and a warning suitably issued/generated.

JP-A-62-51746 discloses an arrangement which has been proposed in order to monitor the operation of an EGR system and to diagnose improper operation thereof. In this arrangement, a valve which controls the flow of exhaust gas from the exhaust conduit to the induction system, is momentarily closed and the induction pressure which is detected during this period, is compared with the pressure detected while the valve is open. This data is used to develop a pressure differential value $\Delta P$. That is to say $\Delta P = (Pon - Poff)$ where Pon and Poff represent the pressures which are detected while the valve is open and closed, respectively.

While this pressure differential exhibits a predetermined relationship with a predetermined standard value, the operation of the valve is deemed to be normal.

However, with this type of arrangement the parameter on which the decision is based (in this case the pressure differential value) is apt to vary to a degree that erroneous diagnosis is apt to occur.

Figure 1:
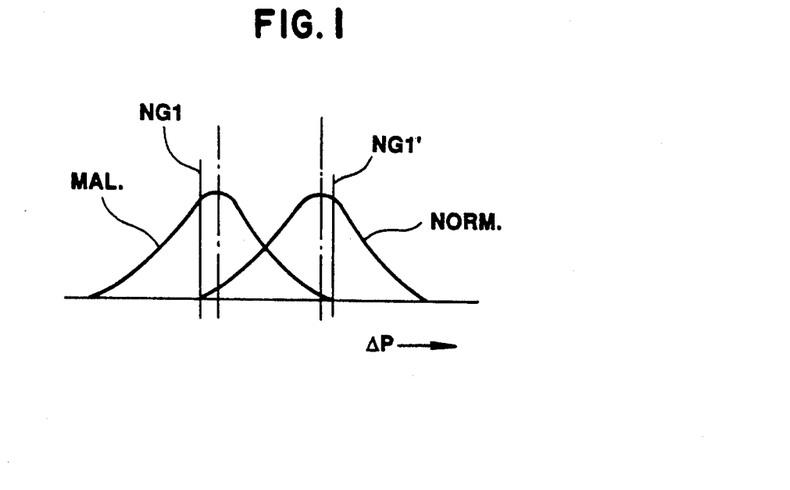
FIG. 1 is a distribution diagram showing the error which can occur in the event that only a single sampling is taken.
Figure 2:
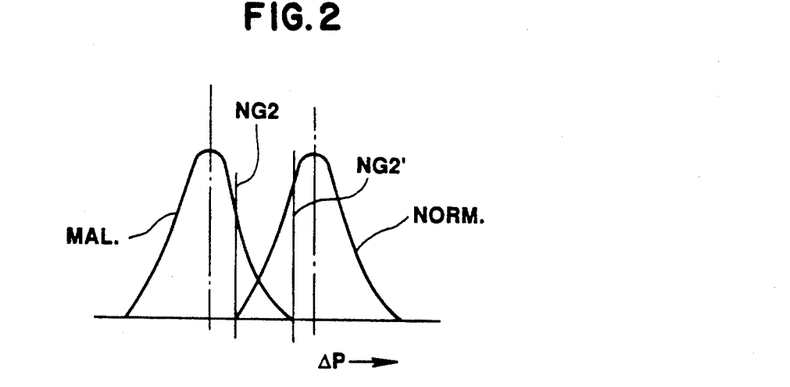
FIG. 2 is a distribution diagram showing the characteristics which are obtained in the event that two sequential pressure samples are conducted.
Figure 3:
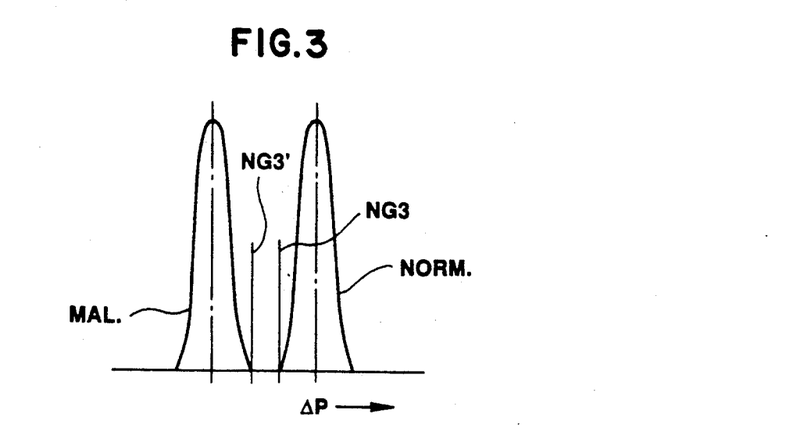
FIG. 3 is a distribution diagram showing the characteristics which are obtained in the event that a suitably large number of sequential pressure samples are taken.

That is to say, FIGS. 1 to 3 show the situations wherein the number of time the pressure differential is sampled once, twice and a number of times greater than 1. As will be appreciated from FIG. 2, when only one sampling is taken, the abnormal (malfunction) and normal operation pressure differential distributions overlap to degree that it is possible that, even though the arrangement is working normally, still the pressure differential which is produced under certain engine operating conditions can be taken as being indicative of a malfunction and vice versa.

As a result of the above, when a predetermined standard pressure differential value is used as the $\Delta$PNG, due to the above distribution overlap, it is possible that even if the system is operating normally, still a malfunction indication can be undesirably produced. While reduced, this possibility remains even when two samples are taken (see FIG. 2).

To overcome this problem and to increase the accuracy of the diagnostic system, it has been thought to record a number of pressure differential values and derive an average $\Delta$Pav which can then be compared with a predetermined standard value $\Delta$PNG. In the event that the deviation exhibits a normal distribution, the standard deviation $\sigma A$ exhibits the following relationship with the number of samples n which are used to develop the average.

$$\sigma A = \frac{\sigma}{\sqrt{n}}$$

As the value of n increases the average $\Delta$Pav is such that the normal and abnormal operation distributions separate in the manner depicted in FIG. 3 wherein the possibility of error with respect to $\Delta$PNG becomes essentially non-existent.

However, with this type of arrangement it is very difficult to achieve the required number of sequential pressure differential samples. That is to say, during vehicle operation the time for which the engine operational characteristics remain in a region suitable for sampling and system diagnosis is possible, is relatively short. Accordingly, if n is set to a suitably high value, the possibility that the required number of samples which are needed to develop a fully reliable $\Delta$Pav value, will not be taken during any given run of the diagnostic routine exists and, leads to the drawback that it may be some time before a complete diagnosis can be successfully carried out and the existence of a malfunction actually determined.

SUMMARY OF THE INVENTION

It is an object of the present invention to provide a technique/system for rapidly and accurately ascertaining if a given control system is malfunctioning or not.

If brief, the above object is achieved by an arrangement wherein a selected parameter is sampled and an average value developed. As the number of sequential samples increases and the average becomes more reliable, the standard against which it is judged is also upgraded so as to render the test for normal operation more severe.

More specifically, a first aspect of the present invention comes in a diagnostic method which features the steps of: sampling the magnitude of a parameter; recording a plurality of sequential samples; recording the number of times the parameter is sampled; determining an average sample value; determining a reference value based on the number of times the parameter has been sampled; comparing the average sample value and the reference value; and determining that a malfunction has occurred in the event that the average exhibits a predetermined relationship with the reference value.

A second aspect of the present invention comes in the form of a diagnostic method which features the steps of: measuring the magnitude of a parameter; recording the measurements; recording the number of times the parameter is sampled; determining an average sample value; dividing the average with a predetermined value to obtain a dividend determining a reference value based on the number of times the parameter has been sampled; and determining that a malfunction has occurred in the event that the dividend exhibits a predetermined relationship with the reference value.

A third aspect of the present invention comes in a diagnostic arrangement which features: means for sampling the magnitude of a parameter; means for recording a plurality of sequential samples; means for recording the number of times the parameter is sampled; means for determining an average sample value; means for determining a reference value based on the number of times the parameter has been sampled; means for comparing the average sample value and the reference value; and means for determining that a malfunction has occurred in the event that average exhibits a predetermined relationship with the reference value.

A fourth aspect of the present invention comes in a diagnostic arrangement which features: means for measuring the magnitude of a parameter; means for recording the measurements; means for recording the number of times the parameter is sampled; means for determining an average sample value; means for dividing the average with a predetermined value to obtain a dividend; means for determining a reference value based on the number of times the parameter has been sampled; and means for determining that a malfunction has occurred in the event that the dividend exhibits a predetermined relationship with the reference value.

A further aspect of the present invention comes in an engine system which features: an engine; an induction system for supplying an air-fuel mixture to the engine; an exhaust system for receiving exhaust gases from the engine; an EGR system including an EGR conduit which leads from the exhaust system to the induction system and through which a portion of the exhaust gases from the exhaust system is recycled to the induction system; valve means for controlling the flow of exhaust gases through the EGR conduit, said valve means including a solenoid controlled valve via which the EGR conduit can be selectively cut-off; an induction pressure sensor disposed in the induction system for sensing the induction pressure and outputting a signal indicative thereof; diagnostic means responsive to the output of said induction pressure sensor for: taking a first pressure measurement at the moment that the solenoid controlled valve is conditioned to cut off the flow of exhaust gas through the ERG conduit, a second measurement at the time the moment the solenoid controlled valve is subsequently conditioned to permit exhaust gas to again flow through the EGR conduit, and a third measurement a predetermined time after the second measurement, determining a first difference between the first and second measurements; determining a second difference between the second and third measurement; determining an average of the first and second differences, dividing the average with a predetermined value to obtain a first dividend; dividing the dividend with the number of times the first, second and third measurements have been sequentially taken to obtain an average dividend; determining a standard value based on the number of times the first, second and third measurements have been taken, comparing the standard value with the average dividend, and determining that a malfunction has occurred in the ERG system in the event that the average dividend exhibits a predetermined relationship with the standard value.

Yet another aspect of the present invention comes in an engine system which features: an engine; an induction system for supplying an air-fuel mixture to the engine; an exhaust system for receiving exhaust gases from the engine; an air-fuel ratio sensor disposed in the exhaust system for sensing the air-fuel ratio of the gases flowing therein; and diagnostic means responsive to the output of said air-fuel ratio sensor, for: recording the time required for the output of the sensor to change from one extremum to another; averaging sequentially recorded times; comparing the averaged recorded times with a standard value which is varied in accordance with the number of recorded times used to determined the average; and determining that the air-fuel ratio sensor has undergone a predetermined change in the event that the averaged sample times exhibit a predetermined relationship with the standard value.

DETAILED DESCRIPTION OF PREFERRED EMBODIMENTS

Figure 4:
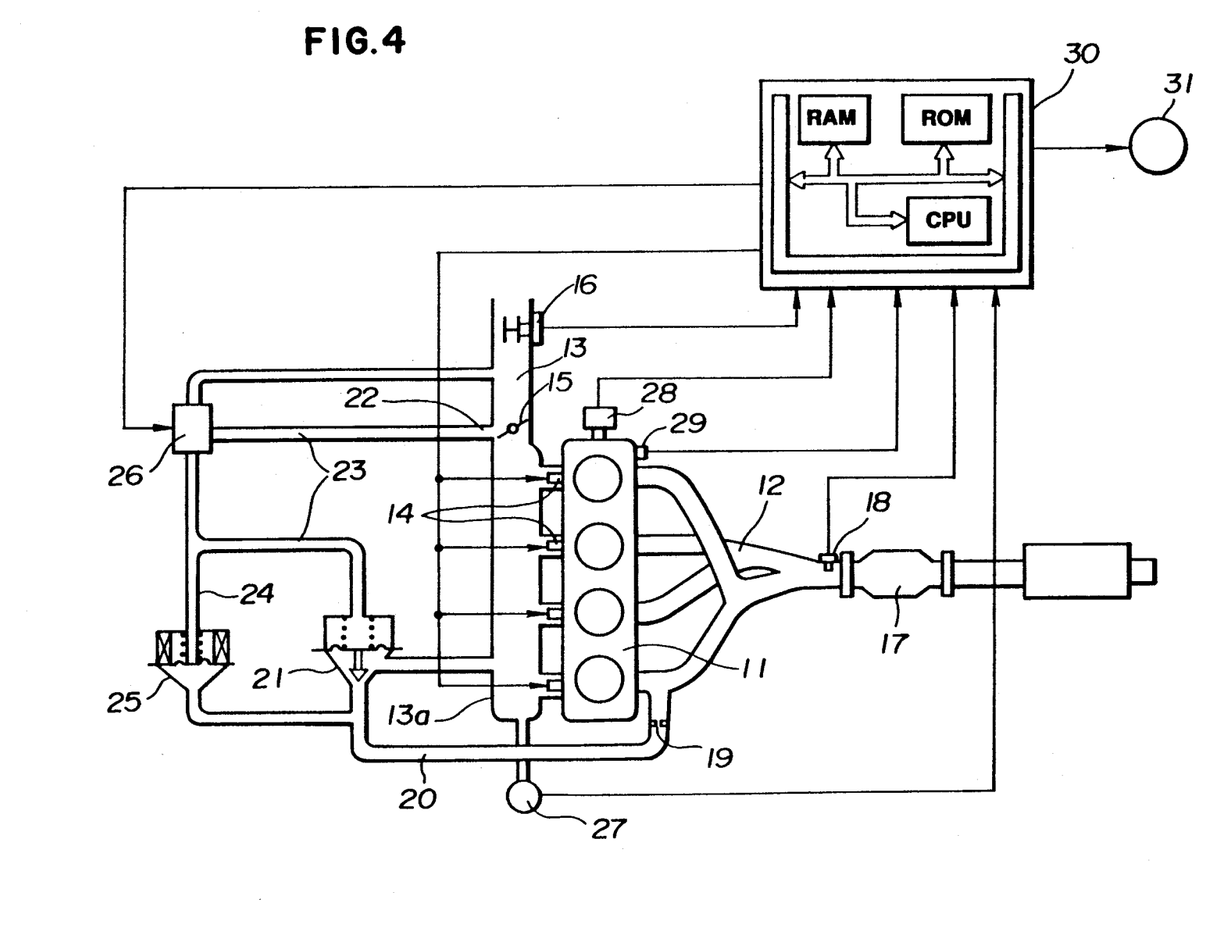
FIG. 4 is schematic diagram showing an engine system of the nature to which the present invention is applicable.

FIG. 4 shows an engine system of the type to which the present invention is applied. This system comprises an engine 11, an exhaust system including a exhaust manifold 12, and an induction system including an induction manifold 13, a plurality of fuel injectors 14 which are disposed at the downstream ends of the induction manifold branch runners and arranged to inject fuel into the respective induction ports formed in the engine cylinder head, a throttle valve 15 which is disposed in a throttle chamber located immediately upstream of the induction manifold collector 13a, and a hot wire type air-flow meter 16 which is disposed in the induction system at a location upstream of the throttle valve 15.

On the other hand, the exhaust system includes a three-way catalytic converter 17 which is disposed in the exhaust system and arranged to receive the exhaust gases which are discharged into the exhaust manifold 12. An oxygen sensor 18 is disposed upstream of the catalytic converter 17. This sensor is arranged to be responsive to the amount of oxygen which is contained in the exhaust gases and produces a signal the level of which produces a marked change in response to an oxygen concentration indicative of the stoichiometric air-fuel ratio.

An orifice 19 is disposed in an EGR conduit which leads from the exhaust manifold 12 to the induction manifold 13. An ERG control valve 21 is disposed in the conduit 20 at a location downstream of the orifice 19. This valve is operated by a vacuum operated diaphragm servo. The vacuum chamber of the servo is supplied vacuum from a VC vacuum port 22 via a vacuum supply conduit 23. The level of vacuum prevailing in the conduit 23 is controlled by an atmospheric pressure conduit 24 and a BPT (back pressure transducer) type pressure control valve 25.

As will be appreciated, the control valve 25 is responsive to the pressure which prevails in the EGR conduit 20 which pressure is in turn modified by the operation of the EGR control valve 21. That is as the level of vacuum in the conduit 23 increases the amount of lift of the EGR valve 21 increases. However, as the pressure in the EGR conduit 20 reduces due to the reduced flow restriction, the amount of atmospheric pressure (air) which is admitted via conduit 24 increases and thus reduces the vacuum level. This reduction causes the EGR control valve 21 to close. As a result of this closure, the pressure prevailing in the EGR conduit downstream of the orifice 19 increases, the amount atmospheric air which is admitted via conduit 24 is limited and the EGR control valve 21 is again lifted to assume an open position. The EGR rate is thus controlled to a predetermined level.

An electromagnetically operated three-way EGR cut-off valve 26 is disposed in the vacuum supply conduit 23. When this valve is de-energized (OFF) vacuum is supplied from the VC port 22 to the vacuum chamber of ERG control valve servo. On the other hand, when this valve is energized (ON) the supply of vacuum from the VC port is shut off and atmospheric air from an atmospheric port is supplied into the vacuum supply conduit 23.

The above mentioned EGR cut-off valve 26 is used to stop EGR when the engine is being started, is still cold or is idling and is further used in connection with the diagnostic monitoring of instant invention as will become apparent hereinlater.

A pressure sensor 27 is disposed in a location to sense the gauge pressure prevailing in the induction manifold collector 13a at a location downstream of the throttle valve 15.

The engine system further comprises an engine speed sensor 27 which in this instance takes the form of a crank angle sensing device, and an engine coolant temperature sensor 29.

A control unit 30 is arranged to receive data inputs from the above mentioned sensors and process the information. This processing of course includes the determination the amount of fuel which should be injected based on the engine speed and load data provided by the engine speed sensor 28 and the air flow meter 16 along with the air-fuel ratio indicative data fed back from the O2 sensor 18, and the output of injection control pulses of the appropriate width.

In addition to this, the control circuit 30 is arranged to suitably switch the EGR cut-off valve 26 ON and OFF based on the engine coolant temperature, engine speed and load data, and further in accordance with the diagnostic control which characterizes the present invention.

A lamp or similar warning device 31 is operatively connected with the control circuit 30 and arranged to be illuminated upon a malfunction being detected.

It should be noted at this stage that, each time a malfunction is detected this detection is recorded in a suitable memory such as a RAM which forms part of a microprocessor included in the control circuit 30.

Figure 5:
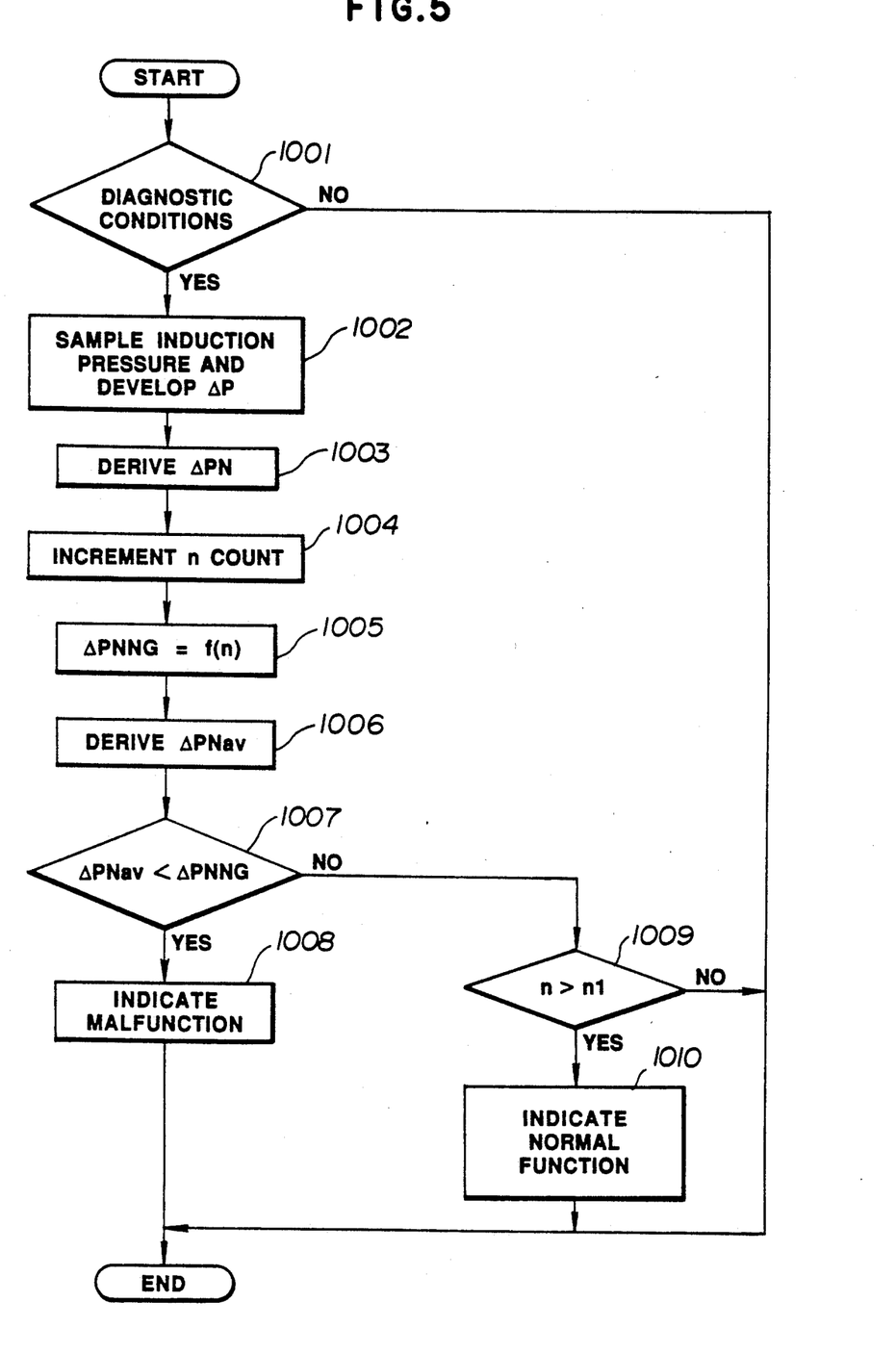
FIG. 5 is a flow chart depicting the steps which characterizes a diagnostic routine according to a first embodiment of the present invention.
Figure 6A:
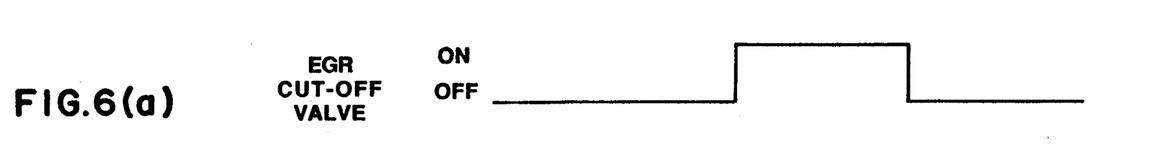
FIG. 6 is a timing chart showing the relationship between the control of an EGR cut-off valve and the corresponding changes in induction pressure which are induced thereby.
Figure 6B:
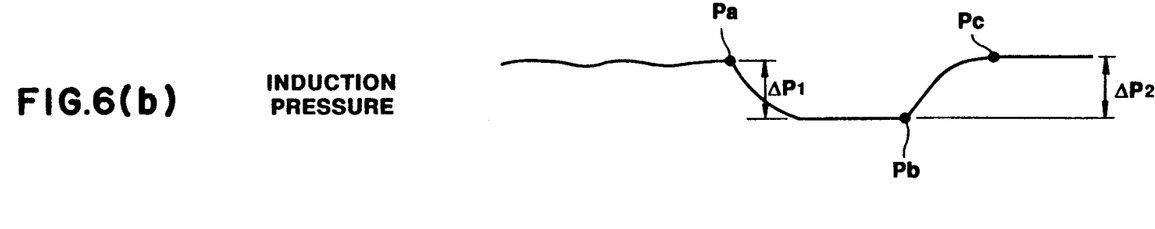

The above mentioned microprocessor further includes a ROM in which a diagnostic program of the nature depicted in the flow chart of FIG. 5 is stored. The routine which is depicted in this figure is such as to be run at predetermined time intervals via interrupt in the microprocessor CPU. The first step 1001 of this routine is such as to determine if the engine system is operating under conditions which will permit the operability of the system to be monitored or not. That is operating under conditions wherein the engine speed, coolant temperature, throttle opening etc., fall in predetermined ranges. In the event the appropriate conditions are found to exist, the routine goes on to step 1002 wherein the difference $\Delta P$ between the induction pressure with the EGR cut-off valve ON and the induction pressure which prevails when the EGR cut-off valve is OFF, is determined. FIG. 6(a) and FIG. 6(b) show an example of how the induction pressure varies in response to a brief energization of the EGR cut-off valve 26. Upon the valve being energized, atmospheric air is supplied into the vacuum supply conduit 23 in place of the VC vacuum and the EGR control valve 21 assumes a closed state. At the time the EGR cut-off valve is energized the output of the induction pressure sensor 27 is sampled and the pressure recorded as value Pa. As will be appreciate from the trace shown in FIG. 6(b), the period for which is EGR cut-off valve 26 is energized is sufficiently long to permit the induction pressure to drop and assume a stable value. Upon the energization being terminated, the output of the sensor 27 is again sampled and the result recorded as Pb. A predetermined period following the de-energization, the output of the sensor 27 is again sampled and the value recorded as Pc. The difference between the Pa and Pb values is set in memory as $\Delta P1$ while the difference between the values Pb and Pc is set as $\Delta P2$. The average of these two values $(\Delta P1+\Delta P2)/2$ is then determined and set as the instant $\Delta P$ value.

At step 1003 the just derived $\Delta P$ value is divided by the Pa value and the result recorded as a value $\Delta PN$.

It will be noted that even if the system is functioning normally and the value of Pa varies due to changes in engine load and other driving related factors, by deriving a ratio in the above described manner it is possible to negate the error which is encountered in the prior art arrangements.

It should be noted that when the pressure differential between the Pa value and the exhaust pressure becomes small, the relationship deteriorates and that, in order to provide for such cases it is possible to use a predetermined divisor in place of the Pa value.

Figure 7:
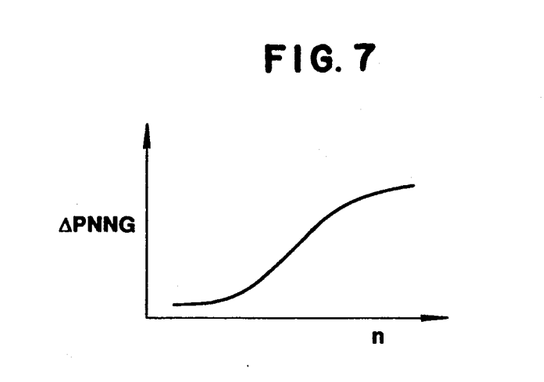
FIG. 7 is a graph demonstrating on example of how, in accordance with the present invention, the reference value which is used to determine normal/malfunction operation, is varied as the number of samples n increases.

After having derived the $\Delta PN$ value the routine proceeds to step 1004 wherein a counter n which records the number of times the pressure differential value $\Delta PN$ has been determined (i.e., the number of times the pressure differential value $\Delta P$ has been measured) is incremented. Following this in step 1005, the standard value $\Delta PNNG$ which is used to determine if the system is malfunctioning or not, is determined. The $\Delta PNNG$ value varies as a function of n in the manner as indicated in FIG. 7. Accordingly, it is possible to determine $\Delta PNNG$ using either an algorithm or by a look-up technique using suitably mapped data.

At step 1006 an average $\Delta PNav$ of the n $\Delta PN$ values which are recorded in memory are, is derived and compared with the $\Delta PNav$ value in step 1007.

In the event that the n=1 by way of example, the value of $\Delta PNNG$ is still extremely low. Therefore, if the comparison which is conducted in step 1007 indicates that $\Delta PNav < \Delta PNNG$ then it can be reliably concluded that the $\Delta P$ pressure value, which is relatively free from the error due to deviation problem, is too low. Accordingly, the routine flows to step 1008 wherein a command to issue a malfunction indication is issued and the n count is reset to zero.

On the other hand, if the outcome is such as to indicate that ΔPNav is greater than ΔPNNG then the routine flows across to step 1009 wherein it is determined if the counter which is incremented in step 1004, wherein it is determined if the counter which is incremented in step 1004, has reached a predetermined number n1. In the event that the count is not exceeded the n1 value the routine is not permitted to pass through step 1010.

Upon the value of n exceeding the n1 value the routine is directed from step 1009 to step 1010 wherein a command to issue a normal operation indication is issued and the count n is reset to zero.

As the value of n increases the reliability of the ΔPN average ΔPNav increases. At the same time the value of ΔPNNG increases thus increasing the severity of the test which must be passed in order to achieve a non-malfunction indication.

With this type of technique it is possible to very quickly detect a malfunction even when driving conditions which enable diagnosis prevail for only a short time. In addition, the effect of deviations which tend to bring about erroneous diagnostic results even when there is no malfunction and the system is working normally, are negated, and the problem wherein an erroneous malfunction warning is issued, is obviated.

Second Embodiment

Figure 8:
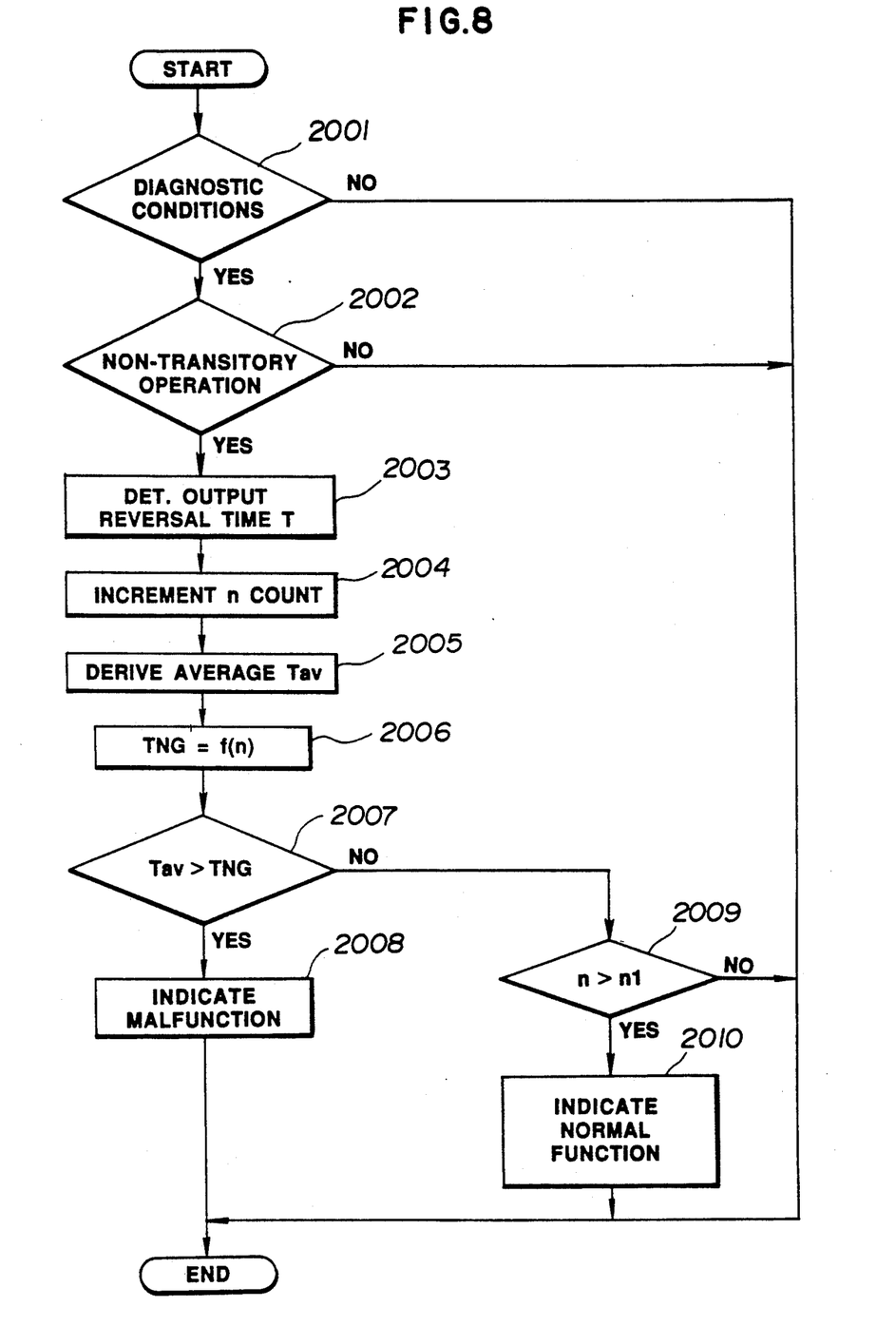
FIG. 8 is a flow chart depicting the steps which are executed in a second embodiment of the present invention.

FIG. 8 shows in flow chart form the steps which are executed in accordance with a second embodiment of the present invention.

This embodiment is directed to monitoring the operation of an O2 sensor and to detecting a malfunction therein which is apt to interfere with the accuracy of the air-fuel ratio feedback control.

As is well known, the output of an O2 sensor is compared with a slice level which is set to represent the stoichiometric air-fuel ratio and which level is crossed when the air-fuel ratio changes from a value just on the rich side to one which is just on the lean side.

When an O2 sensor deteriorates with the passing of time, the period required for the sensor output to change from a rich indicative value to one indicative of a lean mixture, increases. This of course reduces the effectiveness of the resulting feedback control.

The instant embodiment monitors this period and determines the sensor condition based on the same.

The first step of the routine shown in FIG. 8 is such as to determine if conditions suitable for monitoring the output of the O2 sensor exist or not. This decision can be based on the engine coolant temperature, engine speed, engine load, etc. For example, if the temperature is in a suitable range and/or if an engine speed/load ratio is within a preset range and/or if the engine load is within predetermined minimum and maxim values, it can be assumed that the output of the O2 sensor can be relied upon for feedback control purposes and that it is possible to accurately monitor for possible malfunction. Following this, it is necessary to determine if the engine is operating under steady state conditions or not. Thus, at step 2002 it is determined if the engine is undergoing acceleration/deceleration or not. This can be ascertained, by way of example, by determining if the amount of throttle position change, the amount of engine speed change fall with predetermined small ranges.

In the event of non-transitory or steady state operation, the routine goes on to step 2003 wherein a sub-routine which determines if a change in output has occurred and how long the change required to change from a rich indicative level to a lean indicative one, or vice versa. That is the time required for the output to change from one extremum to the other.

At step 2004 a counter which records the number of samples is incremented and the routine proceeds to step 2005 wherein the average Tav of the T samples is developed. Following this in step 2006 mapped data or a suitable algorithm is used to determine a suitable standard time TNG against the average Tav can be compared. Merely by way of example, the TNG can be arranged to vary with the increase in n in a manner which increases the severity of the test which must be passed in order to receive a non-malfunction indication.

At step 2007 Tav is compared with TNG and in the event that the Tav>TNG then it can assumed that the T has become too long and that the O2 sensor has deteriorated to the point of exhibiting inadequate response characteristics. In response to this indication, the routine flows to step 2008 wherein the count incremented in step 2004 is reset and the a command to issue a malfunction indication is generated.

On the other hand, in the event that Tav does not exceed TNG the routine flows across to step 2009 wherein the instant n count is compared with a predetermined value n1. Until the n1 value is reached the routine is not permitted to pass through step 2010 wherein a normal operation indication is induced.

As will be appreciated, the above concept can be applied to a number of different types of system and there is not limited to the disclosed embodiments.

What is claimed is:

1. A diagnostic apparatus for an internal combustion engine for an automotive vehicle, comprising:
   means for sampling a magnitude of an operating parameter based on the presence of a malfunction of the engine;
   means for recording a plurality of operating parameters sequentially sampled through said sampling step;
   means for recording the number of times the operating parameter is sampled;
   means for determining an average sample value on the basis of the sequentially sampled operating parameters;
   means for determining a reference value necessary to judge the malfunction of the engine;
   means for comparing the average sample value and the reference value to generate a signal representative of the difference between the average sample value and the reference value;
   means responsive to the signal generated by said comparing means, for determining that the malfunction has occurred in the engine in the event that the average sample value exhibits a predetermined relationship with the reference value, and for generating a malfunction indicative signal; and
   a warning indicator provided in the automotive vehicle and responsive to the malfunction indicative signal, for warning of the malfunction of the engine,
   wherein said reference value is variably determined depending on the number of times the operating parameter has been sampled, such that diagnostic severity for the malfunction of the engine, in a comparison between the reference value and the magnitude of the operating parameter, is enhanced in accordance with an increase in the number of times the operating parameter is sampled.

2. The diagnostic apparatus as set forth in claim 1, wherein said means for determining said average sample value includes means for dividing an average value of the sequentially sampled operating parameters with a predetermined value to obtain a dividend and for replacing the dividend as the average sample value.

3. A diagnostic apparatus for an EGR (Exhaust Gas Recirculating) system for an internal combustion engine for an automotive vehicle comprising:

the EGR system including an EGR conduit which leads from an exhaust system employed in the engine to an induction system employed in the engine and through which a portion of the exhaust gases from the exhaust system is recycled to the induction system;

valve means for controlling the flow of exhaust gases through the EGR conduit, said valve means including a solenoid controlled valve via which the EGR conduit is selectively cut-off;

an induction pressure sensor disposed in the induction system for sensing the induction pressure and outputting a signal indicative thereof; and diagnostic means responsive to the output of said induction pressure sensor, for:

taking a first pressure measurement at the moment that the solenoid controlled valve is conditioned to cut-off the flow of exhaust gas through the EGR conduit, taking a second pressure measurement at the moment that the solenoid controlled valve is subsequently conditioned to permit exhaust gas to again flow through the EGR conduit, and taking a third pressure measurement at a predetermined time after the second pressure measurement;

determining a first difference between the first and second pressure measurements;

determining a second difference between the second and third pressure measurements;

determining an average of the first and second differences;

dividing the average with a predetermined value to obtain a first dividend;

dividing the dividend with the number of times the first, second and third pressure measurements have been sequentially taken to obtain an average dividend;

determining a criterion necessary to judge a malfunction of the EGR system, based on the number of times the first, second and third pressure measurements have been taken;

comparing the criterion with the average dividend and determining that the malfunction has occurred in the EGR system in the event that the average dividend is less than the criterion, wherein said criterion is variably determined depending on the number of times the first, second, and third measurements have been taken, such that diagnostic severity for the malfunction of the EGR, in a comparison between the criterion and the average dividend, is enhanced in accordance with an increase in the number of times the first, second and third measurements are taken.

4. A diagnostic apparatus for an air-fuel ratio sensor for an internal combustion engine for an automotive vehicle comprising;

an air-fuel ratio sensor disposed in an exhaust system employed in the engine, for sensing the air-fuel ratio of the gases flowing therein; and diagnostic means responsible to the output of said air-fuel ratio sensor, for:

recording the time required for the output of the sensor to change from one extremum to another;

averaging sequentially recorded times to derive an average of the recorded times;

comparing the average of the recorded times with a criterion which is varied in accordance with the number of recorded times used to determine the average; and determining that the air-fuel ratio sensor has deteriorated to a predetermined degree in the event that the average of the recorded times is greater than the criterion, wherein said criterion is variably determined depending on the number of recorded times, such that diagnostic severity for the malfunction of the air-fuel ratio sensor, in a comparison between the criterion and the average of recorded times, is enhanced in accordance with an increase in the number of recorded times.

* * * * *